Jan. 13, 1942.   S. ORENSTEIN   2,269,731
FREE PARKING METER
Filed Jan. 3, 1940   3 Sheets-Sheet 1

INVENTOR.
Samuel Orenstein
BY
H. B. Wilson & Co. ATTORNEYS.

Jan. 13, 1942.                S. ORENSTEIN                2,269,731
                             FREE PARKING METER
                             Filed Jan. 3, 1940              3 Sheets-Sheet 2
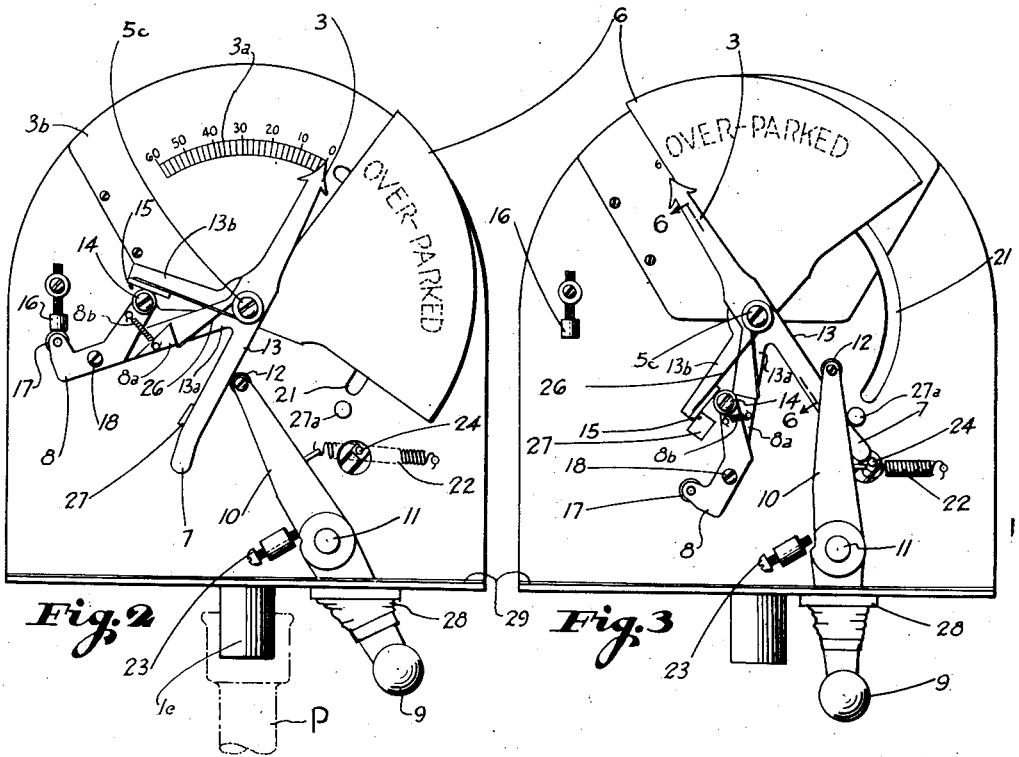
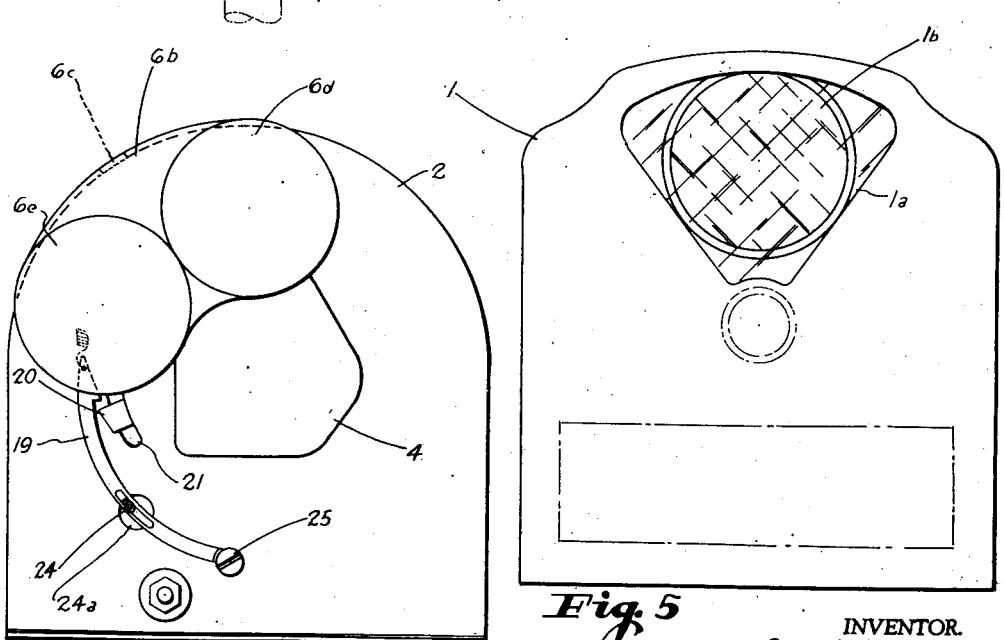
INVENTOR.
Samuel Orenstein
BY
H. B. Wilson &co. ATTORNEYS.

Jan. 13, 1942.   S. ORENSTEIN   2,269,731
FREE PARKING METER
Filed Jan. 3, 1940   3 Sheets-Sheet 3

INVENTOR.
Samuel Orenstein
BY
ATTORNEYS

Patented Jan. 13, 1942

2,269,731

UNITED STATES PATENT OFFICE 2,269,731

FREE PARKING METER

Samuel Orenstein, Providence, R. I., assignor to Fre-Park Timer Incorporated, Providence, R. I., a corporation of Rhode Island Application January 3, 1940, Serial No. 312,310

3 Claims. (Cl. 161—15)

The invention aims to provide a novel parking meter or timer which may be set when a car is parked, without aid of a coin or check, but will function to give a conspicuous indication when the period allowed for parking has elapsed, the idea being to permit free parking for any predetermined length of time but to prevent abuse of the privilege.

With the foregoing in view, the invention resides in the novel subject matter hereinafter described and claimed, description being accomplished by reference to the accompanying drawings.

Figure 2 is a side elevation illustrating the manner in which the parts are set when a car is parked.

Figure 3 is a side elevation with the parts in the positions shown in Fig. 1.

Figure 4 is a rear elevation, the parts being in set position.

Figure 5 is an elevation showing the casing.

Figure 1:
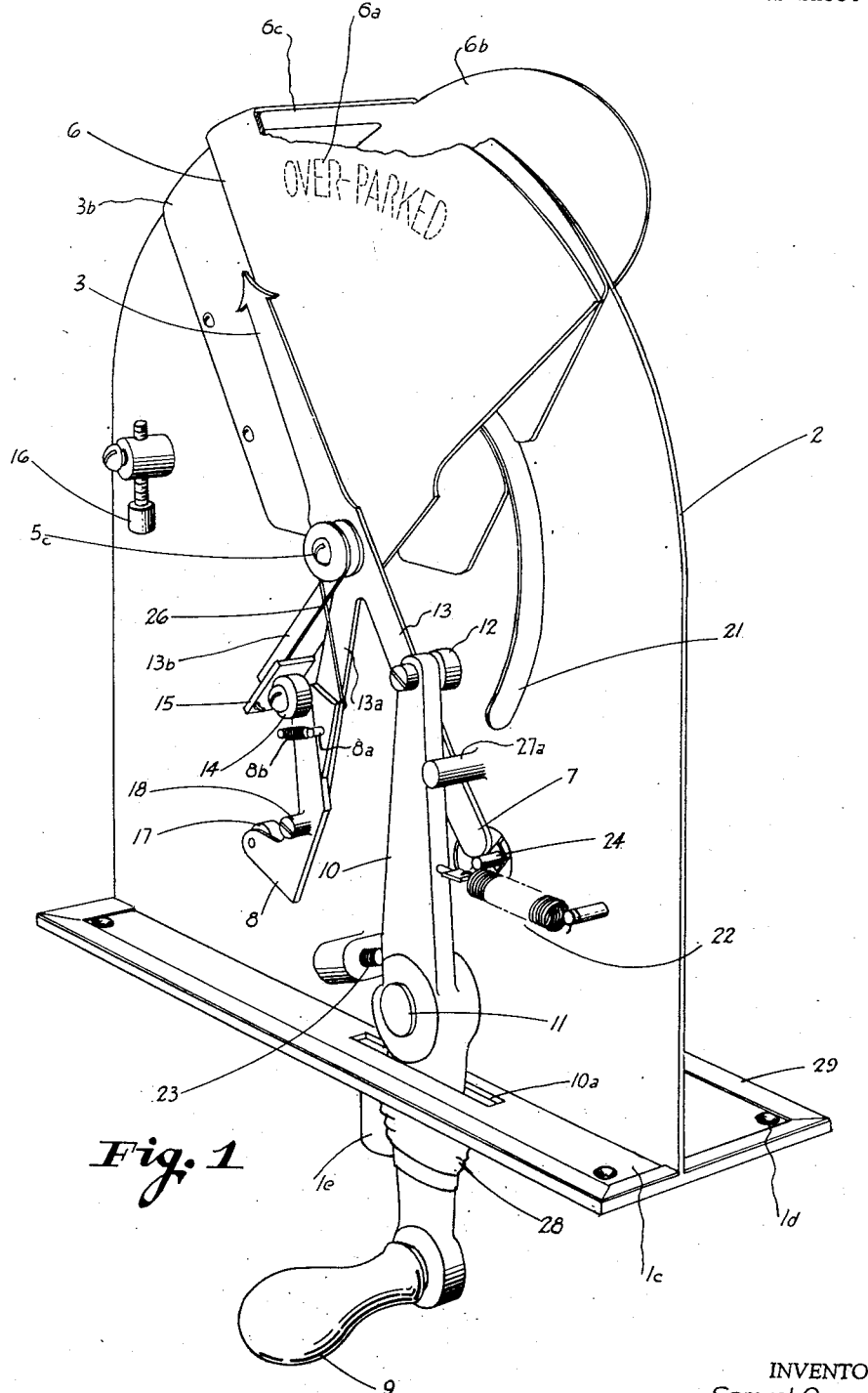
Figure 1 is a perspective view with the casing removed, illustrating the parts in the positions which they occupy at the end of a parking period.

Preferred features of construction have been illustrated and will be rather specifically described, with the understanding, however, that within the scope of the invention as claimed, numerous variations may be made.

A suitable casing 1 is illustrated in Fig. 5, said casing having view openings 1ª and 1ᵇ in its opposite sides, covered with glass or the like weather-tightly mounted. The casing bottom 1ᶜ is detachably secured in place by screws passing through openings 1ᵈ, exclusion of weather being attained by a suitable gasket 29. The lower side of the bottom 1ᶜ is provided with a lug or the like 1ᵉ which facilitates mounting of the casing on the usual post P. The bottom 1ᶜ rigidly carries a vertical plate 2 extending upwardly into the casing and acting as a support for the various movable parts hereinafter described.

A suitable spring-actuated clock mechanism 4 is mounted upon the plate 2 and is provided with a shaft 5 which is slowly rotatable in one direction under the influence of the clock spring, after said shaft has been turned in the other direction to wind said spring. Preferably a friction clutch connection 30 is provided in the driving means for the shaft 5, permitting more accurate setting of the time-indicating pointer 3 than would otherwise be possible. This pointer 3 is secured to the shaft 5 and is cooperable with a time scale 3ª which may well be formed on a plate 3ᵇ secured to one side of the plate 2. A segmental flag 6 is also mounted on the shaft 5 but is loose upon the latter for movement with respect to the pointer 3. The pointer and flag are initially set at the positions shown in Fig. 2 when a car is parked, said pointer being then at zero on the scale 3ª. As the parking time gradually elapses, the pointer 3 advances along the scale 3ª until it reaches the end of said scale, the flag 6 in the meantime remaining in the set position shown in Fig. 2. When the pointer 3 reaches the end of the scale 3ª, it serves to effect release of the flag 6, whereupon the latter moves to a position over and obscuring the scale 3ª, this position being shown in Figs. 1 and 3. When the flag 6 occupies this position, it extends across the opening 1ª of the casing 1, through which opening the scale 3ª is ordinarily visible. The flag may, if desired, carry suitable wording such as that indicated at 6ª to indicate that the parking time has expired and that the car has been over-parked.

The flag 6 is provided with a detent 20 extending through a slot 21 in the plate 2 and cooperable with a spring-applied latch 19 for the purpose of holding said flag in the set position of Fig. 2 until said latch is released. The latch 19 is pivoted at 25 in the present disclosure and is provided with a releasing pin 24 passing through an opening 24ª in the plate 2. The pointer 3 is provided with an arm 13 which strikes the pin 24 and thereby releases the latch 19, when the pointer 3 has substantially reached the end of the time scale 3ª. When this latch release occurs, a spring 26 (Figs. 1 to 3) swings the flag 6 to its visible scale-obscuring position, as seen in Figs. 1 and 3. After releasing the latch 19 by engaging pin 24, the end 7 of the arm 13 abuts a stop 27ª on the plate 2, limiting the movement of the pointer 3 and stopping the clock mechanism. This same arm 13 is cooperable with a roller or the like 12 on a setting lever 10 for the purpose of setting the pointer 3 to zero, and novel provision is made whereby this setting of the pointer also sets the flag 6 (see Fig. 2). The setting lever 10 is fulcrumed at 11 to the plate 2 and passes through an opening 10ª in the casing bottom 1ᶜ, the lower end of said lever being provided with a setting handle 9. The lever 10 is shown moved to setting position in Fig. 2 and its movement in this direction is limited by an appropriate stop screw or the like 23. A weather-excluding bellows 28 surrounds the lever 10 and the slot 10ª, one end of said bellows being fluid-tightly secured to the casing bottom 1ᶜ, while the other end of said bellows is similarly secured to said lever 10, thus preventing any inclement weather conditions from interfering with proper operation of the lever. To restore the lever 10 to the normal idle position shown in Figs. 1 and 3, a suitable spring 22 has been shown.

The pivoted end of the pointer 3 is provided with an arm 13ª which extends to a point spaced radially from the shaft 5. The flag 6 is also provided with an arm 13ᵇ which extends to a point spaced radially from the shaft 5, the arms 13ª and 13ᵇ being spaced apart a suitable number of degrees. A lever 8 is fulcrumed between its ends at 18 upon the arm 13ª and is provided at its opposite ends with rollers 14 and 17 respectively, the roller 14 being cooperable with a push plate 15 on the arm 13ᵇ. The upper end of the lever is normally held against a stop 8ª on the arm 13ª by means of a suitable spring 8ᵇ. When the lever 10 is operated to push against the arm 13 of the pointer 3, the arm 13ª and lever 8 move bodily with said pointer also, the roller 14 then pushing against the plate 15 and thus so pushing the arm 13ᵇ of the flag 6 as to set this flag concurrently with setting of the pointer. An abutment 16, however, is mounted on the plate 2 in the path of the roller 17 of the lever 8. When this roller strikes the abutment 16, the lever 8 is rocked upon its fulcrum 18, thus further pushing the arm 13ᵇ as seen in Fig. 2, thus setting the flag 6 to a greater extent than the pointer 3 so that said flag in its set position will not obscure any portion of the time scale 3ª. When the lever 10 is released, after movement to the position shown in Fig. 2, it is restored to its normal position (Figs. 1, 3 and 4) by the spring 22. The latch 19 in the meantime has engaged the detent 20 of the flag 6 to hold this flag in the set position shown in Fig. 2. The clock mechanism 4 has been wound by setting of the pointer 3 and consequently starts to slowly move said pointer along the scale 3ª. When the pointer reaches the end of the scale, the end 7 of the arm 13 strikes the latch-releasing pin 24, thus releasing the latch 19, whereupon the spring 26 immediately moves the flag 6 to the over-parked position shown in Figs. 1 and 3.

At the side of the plate 2 opposite the flag 6, it is preferable to provide another flag 6ᵇ which may be rigidly connected with said flag 6 by a transverse web or the like 6ᶜ at the edge of the plate 2. The flag 6ᵇ may carry two colored indicating disks or the like 6ᵈ and 6ᵉ for presentation at the opening 1ᵇ of the casing 1. One disk may well be colored green and the other red. When the flag 6 is in the set position shown in Fig. 2, the green disk 6ᵈ will be visible at the opening 1ᵇ and when said flag 6 moves to the over-parked position of Figs. 1 and 3, the red disk 6ᵉ will be visible at said opening 1ª.

As to operation in general, let it first be assumed that the parts stand as seen in Figs. 1 and 3 and that a motorist wishes to park in the space served by the meter. After parking, he will simply move the setting handle 9 to the position shown in Fig. 2. This causes the lever 10 to push against the arm 13 to reset the pointer 3. Simultaneously, arm 13ª moves and causes the lever 8 to pick up and push against the arm 13ᵇ of the flag 6, thus setting this flag and the flag 6ᵇ simultaneously with setting of the pointer. Just before the pointer 3 reaches zero, the roller 17 of the lever 8 strikes the abutment 16, swinging said lever to the position shown in Fig. 2 and causing it to further set the flags, as will be clear from Fig. 2. The latch 19 immediately comes into play to latch the flags in set positions. The clock mechanism 4 having been wound by setting of the pointer 3 starts to slowly drive this pointer toward the end of the time scale 3ª. When the pointer almost reaches the end of the scale, the end 7 of the arm 13 strikes the latch-releasing pin 24, releasing latch 19 and causing spring 26 to move the two flags 6 and 6ᵇ to their over-parked positions, the arm 13ᵇ coming to rest against stop 27. Then, the end 7 of the arm 13 comes to rest against the stop 27ª which may also limit the movement of the lever 10 under the influence of the spring 22, as will be clear from Figs. 1 and 3.

Figures 6, 7:
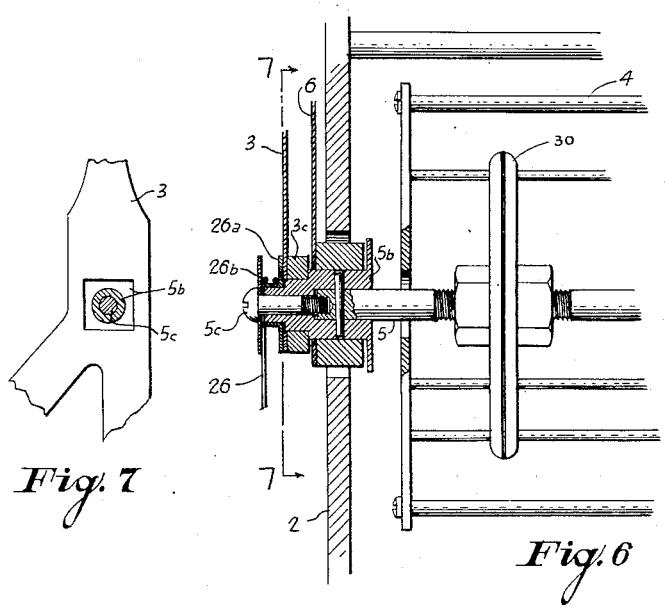
Figure 6 is a view of the friction clutch and a section showing the preferred manner of mounting the pointer, the flag, etc., upon the clock shaft.
Figure 7 is a detail section on line 7—7 of Fig. 6.

In mounting the pointer 3 and flag 6, it is preferable to employ the construction shown in Figs. 6 and 7. A hub 5ᵇ is pinned on the outer end of the shaft 5 and is provided with a squared portion upon which the hub 3ᶜ of the pointer 3 is mounted to connect said pointer with the hub 5ᵇ for rotation bodily with the shaft 5. A spacer 26ª abuts the outer side of the pointer 3 and is held in place by a screw 5ᶜ and a washer 26ᵇ, and the coiled portion of the spring 26 surrounds this spacer.

From the foregoing, taken in connection with the accompanying drawings, it will be seen that I have made novel provision for carrying out the object of the invention. While excellent results are obtainable from the details disclosed and they are, therefore, preferably followed, attention is again invited to the possibility of making numerous variations within the scope of the invention as claimed. In this regard, while I have indicated a 60 minute time scale 3ª, it will be understood that said scale may be of any desired length, and changing the length of the scale and the consequent movement of the pointer 3, will not greatly affect any other parts of the mechanism.

I claim:

1. In a timer having a settable pointer and a settable flag mounted for unidirectional movement; pick-up means for establishing a driving connection from said pointer to said flag to move said flag bodily with said pointer during most of the setting movement of said pointer, and means for so moving said pick-up means as to further move said flag with respect to said pointer as the setting movement of the latter is being completed.

2. In a timer having a settable pointer and a settable flag both mounted to swing about an axis; one arm secured to said pointer and extending to a point spaced radially from said axis, another arm secured to said flag and also extending to a point spaced radially from said axis, means on said one arm for pushing said other arm in flag setting direction when said one arm is moved in pointer setting direction, and means for moving said pushing means with respect to said one arm to further push said other arm in flag setting direction as said one arm completes its pointer setting movement.

3. In a timer having a settable pointer and a settable flag both mounted to swing about an axis; one arm secured to said pointer and extending to a point spaced radially from said axis, another arm secured to said flag and also extending to a point spaced radially from said axis, a lever fulcrumed between its ends on said one arm to swing in a plane transverse to said axis, one end of said lever being disposed against said other arm to push the latter in flag setting direction when said one arm is moved in a pointer setting direction, a stop for holding said lever against swinging with respect to said one arm under the influence of said push, and a fixed abutment in the path of the other end of said lever to swing the latter away from said stop to further push said other arm in flag setting direction as said one arm completes its pointer setting movement.

SAMUEL ORENSTEIN.